United States Patent
Sim et al.

(10) Patent No.: US 9,307,583 B2
(45) Date of Patent: Apr. 5, 2016

(54) COOKING APPARATUS AND OPERATING METHOD THEREOF

(75) Inventors: Sunghun Sim, Seoul (KR); Jaekyung Yang, Seoul (KR); Hyunwook Moon, Seoul (KR); Heungsik Choi, Seoul (KR); Wansoo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1272 days.

(21) Appl. No.: 13/115,728

(22) Filed: May 25, 2011

(65) Prior Publication Data

US 2011/0290790 A1 Dec. 1, 2011

(30) Foreign Application Priority Data

May 26, 2010 (KR) ........................ 10-2010-0049254

(51) Int. Cl.
*H05B 6/66* (2006.01)
*H05B 6/68* (2006.01)
*H05B 6/70* (2006.01)

(52) U.S. Cl.
CPC ................ *H05B 6/686* (2013.01); *H05B 6/705* (2013.01); *Y02B 40/143* (2013.01); *Y02B 40/146* (2013.01)

(58) Field of Classification Search
CPC ...... H05B 6/686; H05B 6/705; Y02B 40/143; Y02B 40/146
USPC ......... 219/687, 702, 703, 709, 710, 711, 712, 219/717, 718, 748; 604/748, 113, 114
See application file for complete search history.

(56) References Cited

U.S. PATENT DOCUMENTS

| | | | | |
|---|---|---|---|---|
| 4,133,997 | A | * | 1/1979 | Thuleen ........................ 219/748 |
| 5,521,360 | A | * | 5/1996 | Johnson et al. ............... 219/709 |
| 8,492,686 | B2 | * | 7/2013 | Bilchinsky et al. ........... 219/678 |
| 2008/0290087 | A1 | * | 11/2008 | Ben-Shmuel et al. ........ 219/748 |
| 2009/0045191 | A1 | | 2/2009 | Ben-Shmuel et al. |
| 2009/0057302 | A1 | | 3/2009 | Ben-Shmuel et al. |
| 2009/0236333 | A1 | | 9/2009 | Ben-Shmuel et al. |
| 2009/0236334 | A1 | | 9/2009 | Ben-Shmuel et al. |
| 2009/0236335 | A1 | * | 9/2009 | Ben-Shmuel et al. ........ 219/710 |
| 2010/0006564 | A1 | | 1/2010 | Ben-Shmuel et al. |
| 2010/0006565 | A1 | | 1/2010 | Ben-Shmuel et al. |

FOREIGN PATENT DOCUMENTS

WO WO 2007/096878 8/2007
WO WO 2009/104191 8/2009

* cited by examiner

*Primary Examiner* — Dana Ross
*Assistant Examiner* — Joseph Iskra
(74) *Attorney, Agent, or Firm* — Dentons US LLP

(57) ABSTRACT

Provided herein are a cooking apparatus and an operating method thereof. The cooking apparatus includes a cavity, a microwave generator to generate and output microwaves of a plurality of frequencies to heat an object within the cavity, and a controller to calculate interpolated microwave frequencies for a heating session, based on microwave frequencies calculated during a scanning session, and to calculate heating times of the interpolated microwave frequencies. Thereby, operating efficiency of the cooking apparatus is improved.

12 Claims, 14 Drawing Sheets

| FREQUENCY | f1 | f2 | f3 | f4 | f5 | f6 | ... | f9 | f10 | f11 | f12 | ... | f22 | f23 | f24 | ... | fn |
|---|---|---|---|---|---|---|---|---|---|---|---|---|---|---|---|---|---|
| HEATING EFFICIENCY(%) | 30 | 65 | 70 | 90 | 70 | 64 | ... | 67 | 73 | 75 | 68 | ... | 63 | 71 | 68 | ... | 30 |

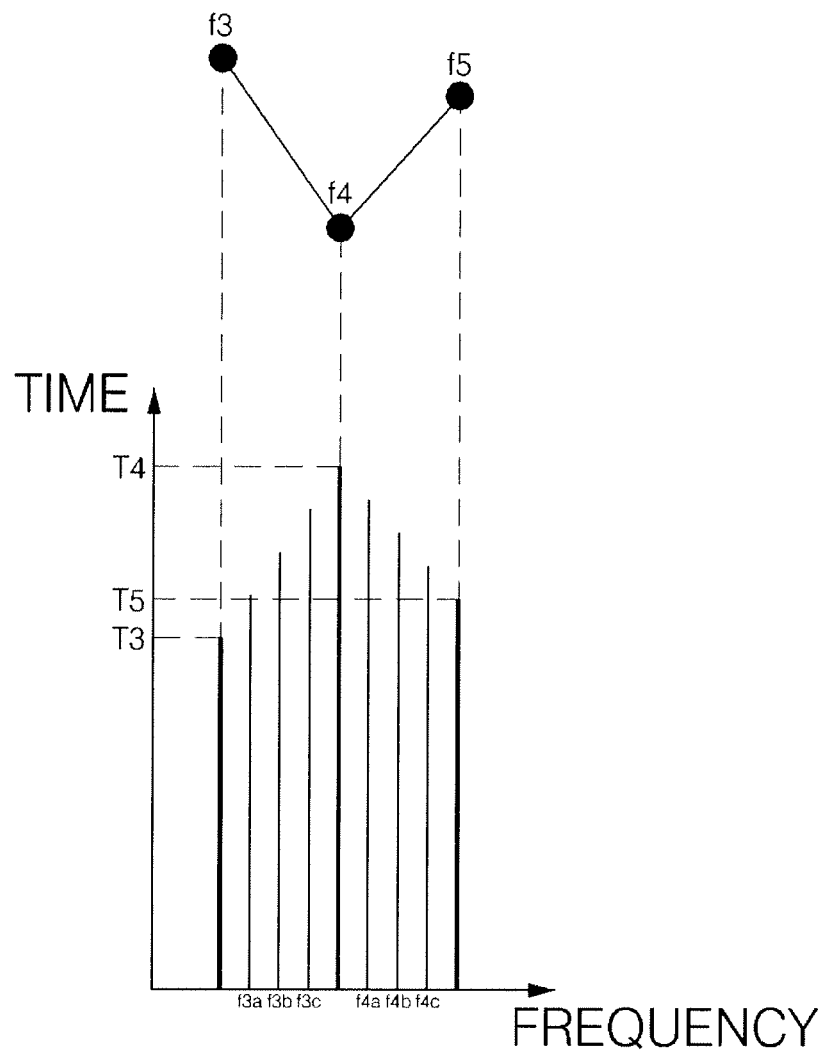

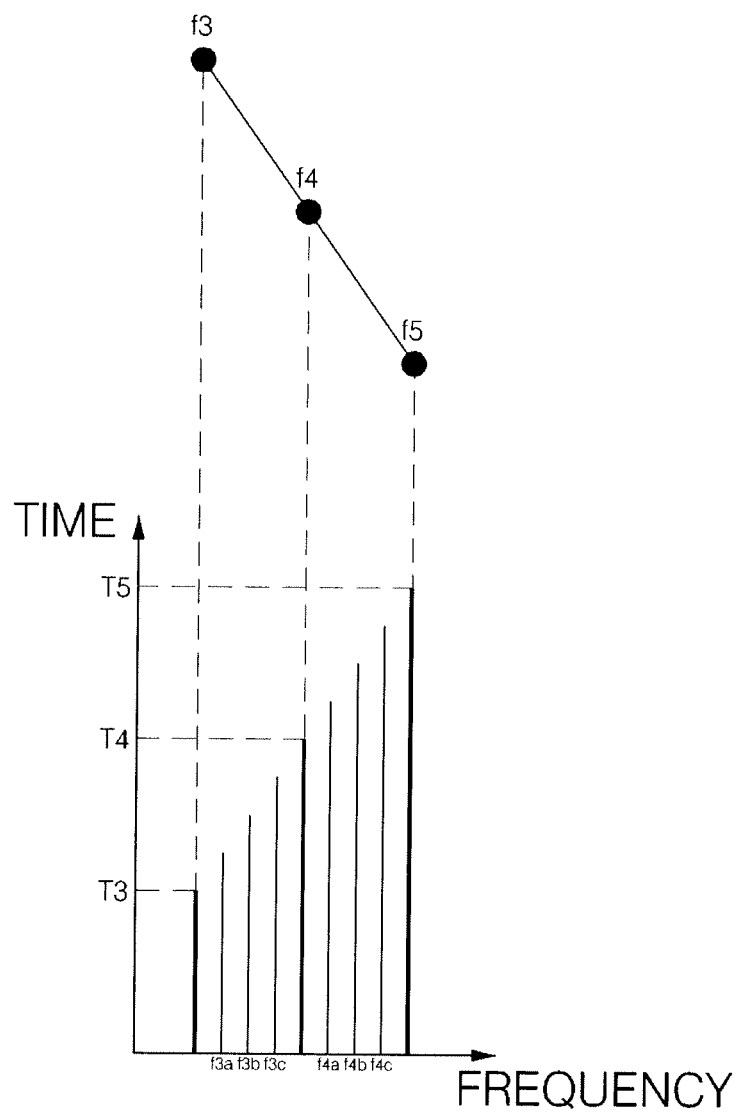

COOKING APPARATUS AND OPERATING METHOD THEREOF

CROSS-REFERENCE TO RELATED APPLICATION

This application claims the benefit of Korean Patent Application No. 10-2010-0049254, filed on May 26, 2010 in the Korean Intellectual Property Office, the disclosure of which is hereby incorporated by reference as if fully set forth herein.

BACKGROUND OF THE INVENTION

1. Field of the Invention

The present invention relates to a cooking apparatus and an operating method thereof, and more particularly to a cooking apparatus, operating efficiency of which is improved, and an operating method thereof.

2. Description of the Related Art

In general, in a cooking apparatus using microwaves, when an operation button is pressed after food is put into a cavity and then the cavity is sealed, voltage is applied to a high-voltage transformer, the commercial voltage applied to the high-voltage transformer is boosted to high-voltage power, the power is applied to a magnetron to generate microwaves and the microwaves generated by the magnetron are transmitted to the cavity through a waveguide, etc.

Here, the cooking apparatus using microwaves heats the food using frictional force generated by vibration of molecules of the food 2,450,000,000 times per second due to irradiation of the microwaves generated by the magnetron onto the food.

Such a cooking apparatus using microwaves has advantages, such as ease of temperature control, cooking time saving, convenience in operation, etc., and thus has been broadly distributed in many households.

However, if food is cooked using microwaves, the food is not uniformly heated due to surface variation of the food and a partial temperature difference of the food may occur. Further, temperature variation during cooking may occur according to kinds of food accommodated in the cooking apparatus.

SUMMARY OF THE INVENTION

An object of the present invention is to provide a cooking apparatus, operating efficiency of which is improved, and an operating method thereof.

To achieve the above objects, there is provided a cooking apparatus according to an exemplary embodiment of the present invention, including a cavity, a microwave generator to generate and output microwaves of a plurality of frequencies to heat an object within the cavity, and a controller to calculate interpolated microwave frequencies for a heating session, based on microwave frequencies calculated during a scanning session, and to calculate heating times of the calculated interpolated microwave frequencies.

To achieve the above objects, there is provided a cooking apparatus according to an exemplary embodiment of the present invention, including a cavity, and a microwave generator to generate and output a plurality of microwaves of different frequencies to heat an object within the cavity, wherein the microwave generator includes a controller to set a frequency interval between the microwaves output to the inside of the cavity during a heating session to be narrower than a frequency interval between microwaves output to the inside of the cavity during a scanning session.

To achieve the above objects, there is provided an operating method of a cooking apparatus according to an exemplary embodiment of the present invention, comprising generating microwaves of a plurality of frequencies by a microwave generator during a scanning session, outputting the generated microwaves to the inside of a cavity, calculating heating efficiencies by a controller based on microwaves reflected by the inside of the cavity, calculating microwave frequencies, the calculated heating efficiencies of which are more than a reference efficiency, calculating interpolated microwave frequencies for a heating session, based on the calculated microwave frequencies, and calculating heating times of the interpolated microwave frequencies, and performing the heating session according to the calculated interpolated microwave frequencies and the calculated heating times of the interpolated microwave frequencies.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE EMBODIMENTS

The advantages and features of the present invention, and the way of attaining them, will become apparent with reference to embodiments described below in conjunction with the accompanying drawings.

Hereinafter, it will be understood that suffixes "module", "unit", and "part" applied to elements used in the following description are used in consideration of ease of illustration and the suffixes themselves do not have discriminative meanings or roles. Therefore, the suffixes "module", "unit", and "part" may be used interchangeably.

Figure 1:
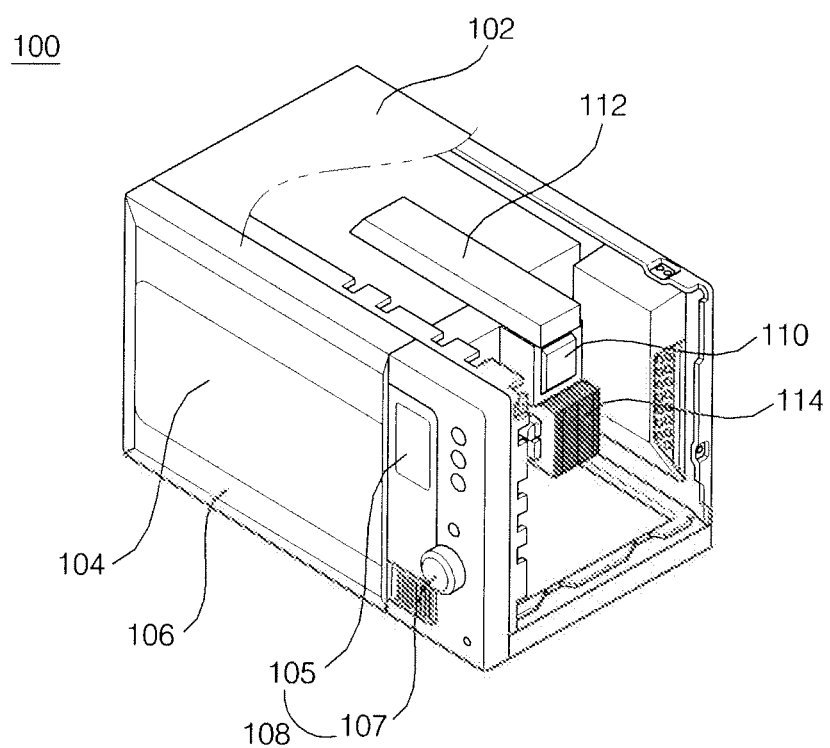
FIG. 1 is a partial perspective view of a cooking apparatus in accordance with one embodiment of the present invention.
Figure 2:
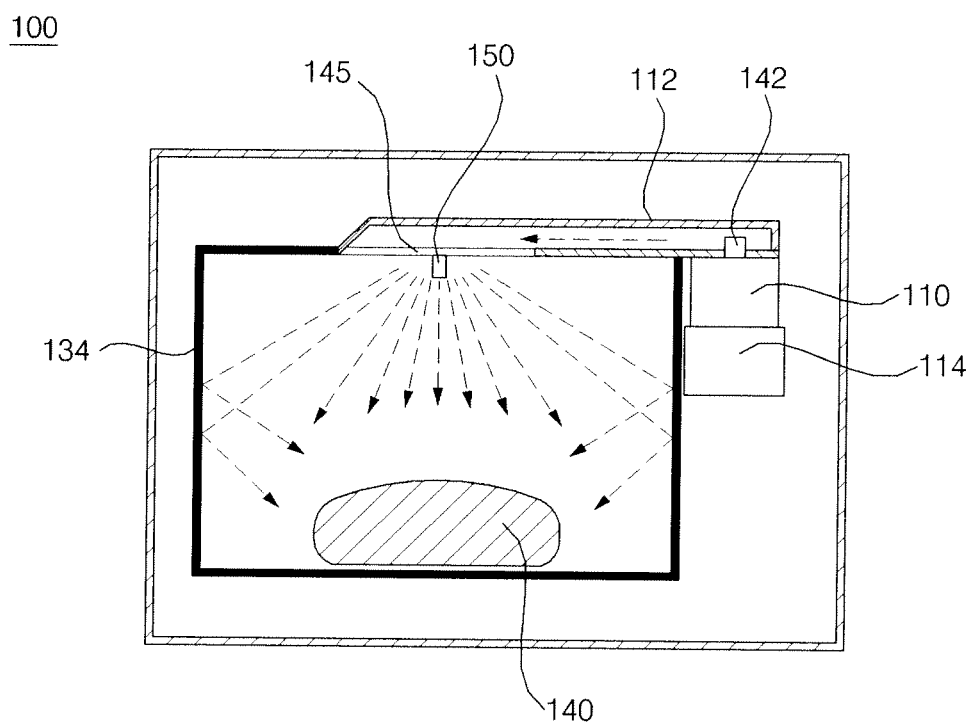
FIG. 2 is a cross-sectional view of the cooking apparatus of FIG. 1.

FIG. 1 is a partial perspective view of a cooking apparatus in accordance with one embodiment of the present invention, and FIG. 2 is a cross-sectional view of the cooking apparatus of FIG. 1.

With reference to FIGS. 1 and 2, a cooking apparatus 100 in accordance with the embodiment of the present invention is configured such that a door 106 provided with a cooking window 104 is connected to a front surface part of a main body 102 so as to be opened and closed and an operation panel 108 is connected to one side of the front surface of the main body 102.

The door 106 opens and closes a cavity 134, and a door choke (not shown) to intercept microwaves may be disposed on the inner surface of the door 106.

The operation panel 108 includes an input unit 107 to control operation of the cooking apparatus 100 and a display 105 to display the operating state of the cooking apparatus 100.

The cavity 134 having an accommodation space of a designated size is provided within the main body 102 such that an object to be heated, for example, food may be accommodated within the cavity 134 and be cooked by microwaves.

The cavity 134 is formed by bonding plates, each of which forms at least one surface, and has an approximately rectangular parallelepiped shape having an opened front surface.

For example, the cavity 134 may be formed by an upper plate forming a ceiling, a rear plate forming the rear surface of the cavity 134, a bottom plate forming the bottom surface of the cavity 134, and a side plate forming the side surfaces of the cavity 134. Further, the door 106 may be disposed on the front surface of the cavity 134. Here, a front plate forming the front surface of the cavity 134 may be formed at regions excluding the door 106.

A microwave generator 110 to generate microwaves is installed on the outer surface of the cavity 134, and a microwave transmission unit 112 to guide the microwaves generated by the microwave generator 112 to the inside of the cavity 134 is disposed at the output side of the microwave generator 110.

The microwave generator 110 may include a magnetron, a Solid State Power Amplifier (SSPA) using a semiconductor, or a Solid State Power Oscillator (SSPO) using a semiconductor.

The SSPA is advantageous in that the SSPA occupies less space than the magnetron. Further, the SSPO is advantageous in that the SSPO does not require a Voltage Controlled Oscillator (VCO) and a Voltage Controlled Attenuator (VCA) as required by the SSPA and thus occupies less space than the SSPA and has a simple circuit configuration.

The SSPA or the SSPO may be implemented as a Hybrid Microwave Integrated Circuit (HMIC) in which passive elements (capacitors, inductors, etc.) and active elements (transistors, etc.) for amplification are separately provided, or a Monolithic Microwave Integrated Circuit (MMIC) in which passive elements and active elements are integrated into one substrate.

The microwave generator 110 may be implemented as one module into which SSPAs or SSPOs are integrated, and may be referred to as a Solid State Power Module (SSPM).

In accordance with the embodiment of the present invention, the microwave generator 110 may generate and output a plurality of microwaves of different frequencies. These frequencies of the microwaves may be in the range of approximately 900 MHz~2,500 MHz. Particularly, the frequencies of the microwaves may be in a designated range around 915 MHz or in a designated range around 2,450 MHz.

The microwave transmission unit 112 transmits the microwaves generated by the microwave generator 110 to the cavity 134. Such a microwave transmission unit 112 may include a transmission line. The transmission line may be a waveguide, a microstrip line or a coaxial cable. In order to deliver the generated microwaves to the microwave transmission unit 112, a feeder 142 is connected, as shown in FIG. 2.

The microwave transmission unit 112 may include an opening 145 communicating with the inside of the cavity 134, as shown in FIG. 2.

The opening 145 may have various shapes, such as a slot. The microwaves are discharged to the cavity 134 through the opening 145.

Although the drawings illustrate one opening 145 as being disposed at the upper portion of the cavity 134, the opening 145 may be disposed at the lower portion or the side portion of the cavity 134, or a plurality of openings may be disposed.

Further, an antenna may be connected to the end of the microwave transmission unit 112.

A power supply unit 114 to supply power to the microwave generator 110 is provided under the microwave generator 110.

The power supply unit 114 includes a high-voltage transformer to boost power input to the cooking apparatus 100 to high voltage and then to supply the high voltage to the microwave generator 110, or an inverter to supply high output voltage of more than approximately 3,500V, generated through switching operation of at least one switch element, to the microwave generator 110.

A cooking fan (not shown) to cool the microwave generator 110 may be installed around the microwave generator 110.

A resonance mode conversion unit (not shown) to convert a resonance mode in the cavity 134 may be disposed. For example, the resonance mode conversion unit (not shown) may include at least one of a stirrer, a rotating table, a sliding table or a Field Adjustment Element (FAE). Among these, the rotating table and the sliding table may be disposed at the lower portion of the cavity 134, and the stirrer may be disposed at various positions, i.e., lower, side and upper positions, of the cavity 134.

In the above-described cooking apparatus 100, after a user opens the door 106 and puts an object 140 to be heated into the cavity 134, when the user closes the door 106, or closes the door 106 and operates the operation panel 108, particularly the input unit 107, and then presses a start button (not shown), the cooking apparatus 100 is operated.

That is, the power supply unit 114 in the cooking apparatus 100 boosts input AC power to high-voltage DC power and then supplies the high-voltage DC power to the microwave generator 110, the microwave generator 110 generates and outputs corresponding microwaves, and the microwave transmission unit 112 transmits the generated microwaves so as to discharge the microwaves to the inside of the cavity 134. Thereby, the object 140 to be heated, for example, food located within the cavity 134, is heated.

Figure 3:
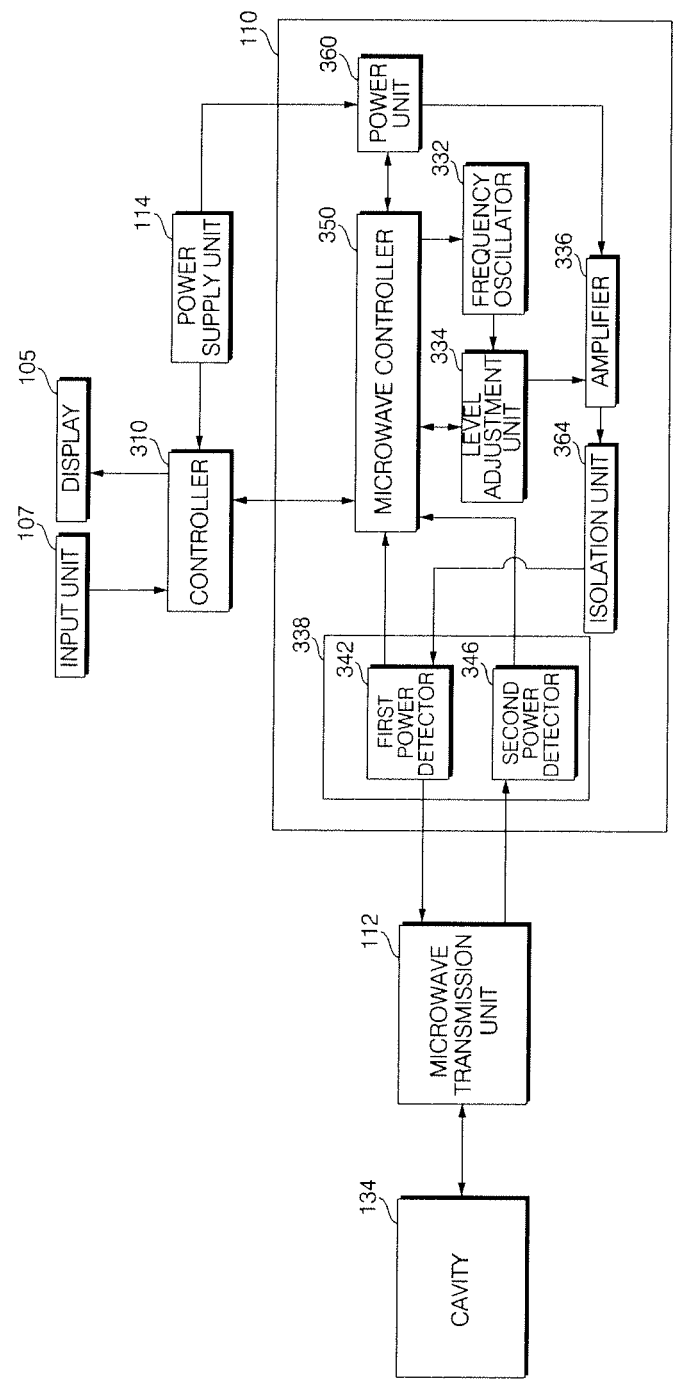
FIG. 3 is a block diagram briefly illustrating one example of the inside of the cooking apparatus of FIG. 1.

FIG. 3 is a block diagram briefly illustrating one example of the inside of the cooking apparatus of FIG. 1.

With reference to FIG. 3, the cooking apparatus 100 in accordance with the embodiment of the present invention includes the microwave generator 110, the microwave transmission unit 112, the cavity 134, a controller 310 and the power supply unit 114.

The microwave generator 110 includes a frequency oscillator 332, a level adjustment unit 334, an amplifier 336, a directional coupler 338, a first power detector 342, a second power detector 346, a microwave controller 350, a power unit 360 and an isolator 364. The microwave generator 110 implemented as the SSPA will be exemplarily described.

In the above elements, two or more elements may be combined into one element, or one element may be divided into two or more elements, as needed in actual applications.

The frequency oscillator 332 oscillates and outputs the microwaves of a corresponding frequency by a frequency control signal from the microwave controller 350. The frequency oscillator 332 may include a Voltage Controlled Oscillator (VCO). The VCO oscillates the corresponding frequency according to a voltage level of the frequency control signal. For example, as the voltage level of the frequency control signal is higher, the frequency oscillated and generated by the VCO is higher.

The level adjustment unit 334 oscillates and outputs the microwaves, having oscillated and output by the frequency signal of the frequency oscillator 332, with corresponding power according to a power control signal. The level adjustment unit 334 may include a Voltage Controlled Attenuator (VCA).

The VCA performs a compensation operation so as to output the microwaves with corresponding power according to the voltage level of the power control signal. For example, as the voltage level of the power control signal is higher, the power level of the signal output from the VCA is higher.

The amplifier 336 amplifies, based on the frequency signal oscillated by the frequency oscillator 332 and the power control signal generated by the level adjustment unit 334, the oscillated frequency signal and then outputs the microwaves.

The Directional Coupler (DC) 338 transmits the microwaves amplified and output from the amplifier 336 to the microwave transmission unit 112. The microwaves output from the microwave transmission unit 112 heat the object in the cavity 134.

Microwaves, which are not absorbed by the object in the cavity 134, instead being reflected by the object, may be input to the DC 338 through the microwave transmission unit 112. The DC 338 transmits the reflected microwaves to the microwave controller 350.

The DC 338 may include the first power detector 342 to detect power of output microwaves and the second power detector 346 to detect power of reflected microwaves. The first power detector 342 and the second power detector 346 may be disposed between the DC 338 and the microwave controller 350, and be disposed on the DC 338 on a circuit.

The first power detector 342 detects output power of microwaves amplified by the amplifier 336 and transmitted to the microwave transmission unit 112 via the DC 338. The detected power signal is input to the microwave controller 350 and is used in heating efficiency calculation. The first power detector 342 may include a resistor, a Schottky diode element, etc. for power detection.

On the other hand, the second power detector 346 detects power of microwaves reflected by the inside of the cavity 134 and received by the DC 338. The detected power signal is input to the microwave controller 350 and is used in heating efficiency calculation. The second power detector 346 may include a resistor, a Schottky diode element, etc. for power detection.

The microwave controller 350 is operated by drive power supplied from the power unit 360 of the microwave generator 110. The microwave controller 350 may control operation of the elements of the microwave generator 110 in communication with the controller 310.

The microwave controller 350 calculates heating efficiencies based on microwaves, which are not absorbed by the object, instead being reflected by the object, from among the microwaves discharged to the inside of the cavity 134.

$$h_e = \frac{P_t - P_r}{P_t} \quad \text{[Equation 1]}$$

Here, $P_t$ represents power of microwaves discharged to the inside of the cavity 134, $P_r$ represents power of microwaves reflected by the inside of the cavity 134, and $h_e$ represents heating efficiency of microwaves.

According to Equation 1 above, as the power of the reflected microwaves is higher, the heating efficiency $h_e$ is smaller.

If microwaves of a plurality of frequencies are discharged to the inside of the cavity 134, the microwave controller 350 calculates heating efficiencies $h_e$ of the microwaves according to frequencies. Such heating efficiency calculation may be performed throughout the entire cooking session according to the embodiment of the present invention.

In order to effectively achieve heating, the entire cooking session may be divided into a scanning session and a heating session. During the scanning session, the microwaves of the plurality of frequencies are sequentially discharged to the inside of the cavity 134, and heating efficiencies are calculated based on reflected microwaves. Further, during the heating session, the microwaves are output for different output times according to frequencies or only microwaves of a designated frequency are output, based on the heating efficiencies calculated during the scanning session. Preferably, power of the microwaves during the heating session is considerably greater than power of the microwaves during the scanning session.

The microwave controller 350 generates and outputs a frequency control signal so as to vary the output times of the microwaves according to the calculated heating efficiencies. The frequency oscillator 332 oscillates a corresponding frequency according to the input frequency control signal.

The microwave controller 350 generates the frequency control signal so that, if the calculated heating efficiency $h_e$ is high, the output time of the corresponding microwaves becomes short. That is, while the microwaves of the plurality of frequencies are sequentially swept, output times of the microwaves of the plurality of frequencies may be varied according to the calculated heating efficiencies. That is, as the heating efficiency $h_e$ is higher, the corresponding output time is preferably shorter. Thereby, the microwaves of may be uniformly absorbed by the object to be heated within the cavity 134 according to frequencies, thus being capable of uniformly heating the object.

On the other hand, the microwave controller 350 may control the microwaves such that the microwaves of the corresponding frequencies are output, only if the calculated heating efficiencies $h_e$ according to the frequencies are more than a set reference efficiency. That is, microwaves of frequencies having low heating efficiencies $h_e$ are excluded from an actual heating time, thereby being capable of effectively and uniformly heating the object.

The microwave controller 350, the power unit 360, the frequency oscillator 332, the level adjustment unit 334, the amplifier 336, the DC 338, the first power detector 342 and the second power detector 346 of the above-described microwave generator 110 may be integrated into one module. That is, these elements may be disposed on a single substrate so as to be integrated into one module.

The microwave controller 350 may calculate heating efficiencies of the microwaves according to frequencies, based on microwaves, which are not absorbed by food in the cavity 134, instead being reflected by the food, from among the microwaves discharged to the inside of the cavity 134, and calculates microwaves of frequencies, the calculated heating efficiencies of which are more than the set reference efficiency. Further, the microwave controller 350 calculates microwave frequencies, and calculates heating times of the calculated microwave frequencies. For example, if heating efficiency is more than the set reference efficiency, as the heating efficiency is higher, the heating time of the microwaves of the corresponding frequency is shorter. Thereby, the object may be uniformly heated.

The microwave controller 350 may control the frequency oscillator 332 and the level adjustment unit 334 so as to output microwaves to heat the food in the cavity to the inside of the cavity 134 based on the calculated heating efficiencies. Preferably, power of microwaves output to the cavity 134 during heating is considerably greater than power of microwaves output to the cavity 134 during measurement of the heating efficiencies.

If the heating efficiency, calculated based on the microwaves reflected by the inside of the cavity 134 from among the output microwaves, is below a reference efficiency during the heating session, the microwave controller 350 may control the microwave generator 110 so as to stop output of the microwaves of the corresponding frequency and to output the microwaves of the next frequency. Thereby, heating may be effectively performed.

Further, the microwave controller 350 may calculate heating efficiencies of the microwaves of the plurality of frequencies, based on the microwave frequencies reflected by the inside of the cavity 134 from among the microwaves output from the amplifier 336, and may set heating times of the respective microwaves during the heating session according to the calculated heating efficiencies.

For example, if, from among the microwaves of the plurality of frequencies, heating efficiency of microwaves of a first frequency is higher than heating efficiency of microwaves of a second frequency, the microwave controller 350 may set heating time of the microwaves of the first frequency to be shorter than heating time of the microwaves of the second frequency.

The microwave controller 350 may output the same power control signal for the microwaves of the respective frequencies to the microwave generator 110 during heating. Further, the level adjustment unit 334 may output a regular power level according to the input power control signal.

The power unit 360 supplies drive power to the elements of the microwave generator 110. The power unit 360 supplies drive power to the microwave controller 350 and the amplifier 336. The power unit 360 receives external power supplied from the power supply unit 114, performs regulation of the external power, and then supplies the regulated power to the inside of the microwave generator 110.

The isolator 364 is disposed between the amplifier 336 and the DC 338, passes microwaves amplified by the amplifier 336 if the amplified microwaves are transmitted to the cavity 134, and intercepts microwaves reflected by the inside of the cavity 134. The isolator 347 may include an isolator. The microwaves reflected by the inside of the cavity 134 are absorbed by a resistor in the isolator 364 and thus do not enter the amplifier 336. Thereby, entry of the reflected microwaves to the amplifier 336 is prevented.

The microwave transmission unit 112 transmits a plurality of microwave frequencies generated and output from the microwave generator 110 to the cavity 134. Such a microwave transmission unit 112 may include a transmission line. The transmission line may be a waveguide, a microstrip line or a coaxial cable.

In order to deliver the generated microwaves to the microwave transmission unit 112, the feeder 142 is connected, as shown in FIG. 2.

The controller 310 controls the overall operation of the cooking apparatus 100 in response to a signal received from the input unit 107. The controller 310 communicates with the microwave controller 350 of the microwave generator 110, thus controlling operation of the elements of the microwave generator 110. The controller 310 controls the display 105 so as to display current operation, remaining cooking time, a kind of food to be cooked, etc. of the cooking apparatus 100 to the outside.

The power supply unit 114 may include a high-voltage transformer to boost power input to the cooking apparatus 100 to a high voltage and then to supply the high voltage to the microwave generator 110, or an inverter to supply high output voltage of more than approximately 3,500V, generated through switching operation of at least one switch element, to the microwave generator 110. Further, the power supply unit 114 supplies drive voltage to the controller 310.

The block diagram of the cooking apparatus 100 shown in FIG. 3 is a block diagram in accordance with the embodiment of the present invention. The respective elements of the block diagrams may be integrated, added, or omitted according to specifications of the actually implemented cooking apparatus 100. That is, two or more elements may be combined into one element, or one element may be divided into two or more elements, as needed. Further, functions performed by respective blocks are provided to describe the embodiment of the present invention, and detailed operations or devices thereof do not limit the scope of the invention.

Figure 4:
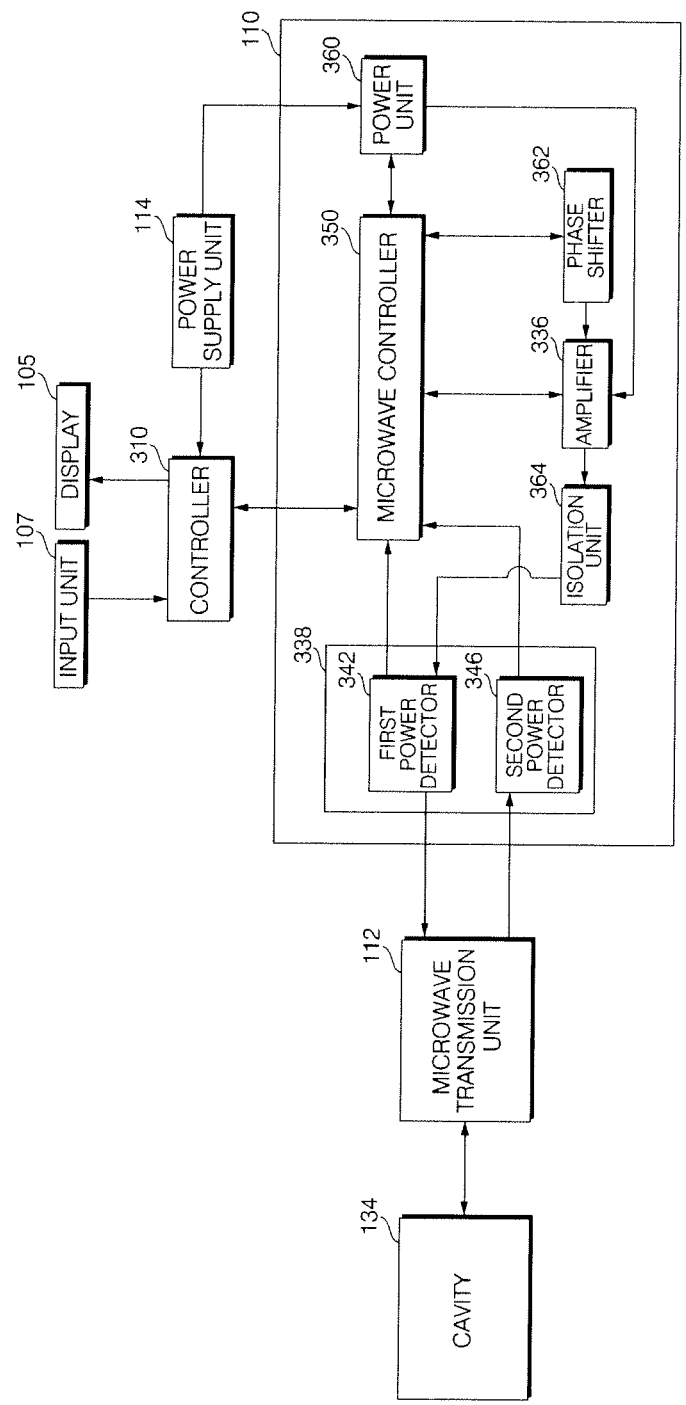
FIG. 4 is a block diagram briefly illustrating another example of the inside of the cooking apparatus of FIG. 1.

FIG. 4 is a block diagram briefly illustrating another example of the inside of the cooking apparatus of FIG. 1.

With reference to FIG. 4, differing from the microwave generator 110 of FIG. 3, the microwave generator 110 implemented as the SSPO will be exemplarily described.

A detailed description of elements of FIG. 4, which are substantially the same as those of FIG. 3, will be omitted.

In accordance with the embodiment of the present invention, the microwave generator 110 may include the microwave controller 350, the power unit 360, a phase shifter 362, the amplifier 336, the isolator 364 and the Directional Coupler (DC) 338.

The DC 338 may include the first power detector 342 and the second power detector 346, as described above.

The microwave generator 110 of FIG. 4 differs from the microwave generator 110 of FIG. 3 in that the microwave generator 110 of FIG. 4 excludes the frequency oscillator 322 and the level adjustment unit 334 of the microwave generator 110 of FIG. 3 and additionally includes the phase shifter 362. Therefore, differing from the microwave generator 110 of FIG. 3, the microwave controller 350 controls the amplifier 336 so as to output microwaves to heat food in the cavity 134, based on calculated heating efficiencies he, to the inside of the cavity 134.

The amplifier 336 receives DC power supplied from the power supply unit 360, and performs frequency oscillation and amplification for itself. That is, the amplifier 336 performs frequency oscillation and performs amplification operation for itself based on received DC power without a separate frequency oscillator to generate and output a frequency oscillation signal.

The amplifier 336 may include at least one RF power transistor. If a plurality of RF power transistors is used, the plural RF power transistors may be connected in series, in parallel, or through combination of series connection and parallel connection so as to achieve multi-stage amplification. For example, such an amplifier 336 may be an RF power transistor. Further, output of the amplifier 336 may be approximately 100 to 1,000 W.

The phase shifter 362 feeds back output of the amplifier 336, thus achieving phase shift. A phase shift amount may be adjusted by a phase control signal of the microwave controller 350. The phase shifter 362 achieves phase shift of an amplification signal of a designated frequency output from the amplifier 336, thereby generating microwaves of various frequencies, as described above. For example, the number of frequencies may be increased in proportion to the phase shift amount.

Preferably, a signal corresponding to approximately 1% to 2% of an amplification signal level of a designated frequency may be sampled and input to the phase shifter 362. This is done in consideration of re-amplification in the amplifier 336 after feedback.

Next, the isolator 364 re-supplies the signal, the phase of which has been shifted by the phase shifter 362, to the amplifier 336. If the level of the signal, the phase of which has been shifted by the phase shifter 362, is below a set value, the isolator 364 may supply the signal, the phase of which has been shifted, to a ground terminal instead of to the amplifier 336.

The signal supplied by the isolator 364 is re-amplified by the amplifier 336. Thereby, microwaves of a plurality of different frequencies are sequentially output.

As described above, since the amplifier 336 performs frequency oscillation and amplification for itself, the microwave generator 110 may be formed in a simple structure. Further, microwaves of a plurality of frequencies may be generated and output using the phase shifter 362.

Figure 5:
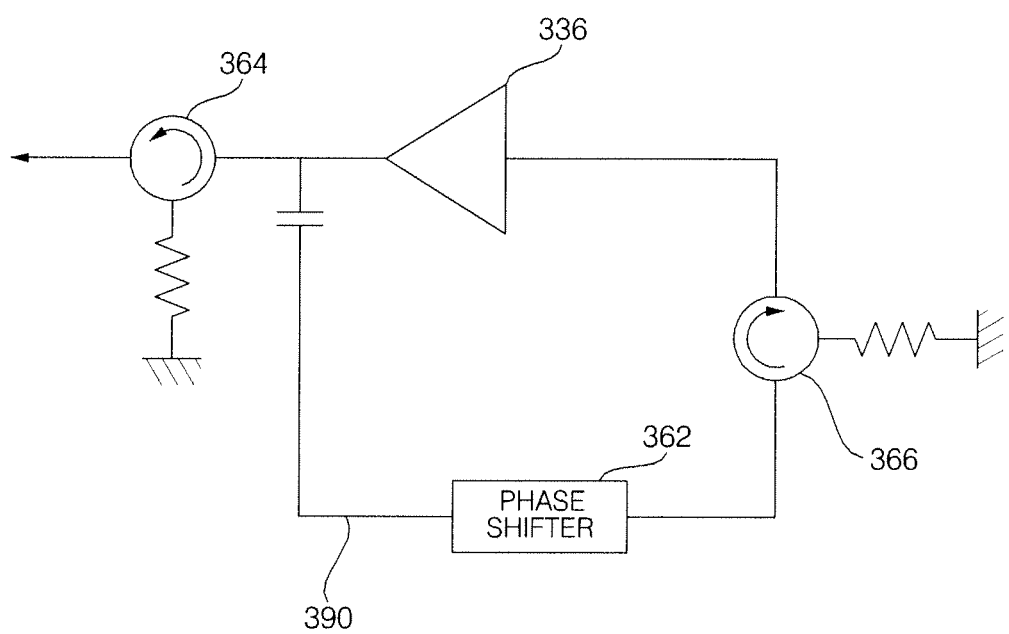
FIG. 5 is a circuit diagram briefly illustrating the inside of a solid state power oscillator of FIG. 4.

FIG. 5 is a circuit diagram briefly illustrating the inside of the SSPO of FIG. 4.

With reference to FIG. 5, the SSPO may include the amplifier 336, the phase shifter 362, the first isolator 364 and a second isolator 366.

The amplifier 336 receives DC power from the power unit 360, and performs frequency oscillation and amplification for itself. That is, the amplifier 336 performs frequency oscillation and performs amplification operation for itself according to receipt of DC power without a separate frequency oscillator to generate and output a frequency oscillation signal.

The amplifier 336 may include at least one RF power transistor. If a plurality of RF power transistors is used, the plural RF power transistors may be connected in series, in parallel, or through combination of series connection and parallel connection so as to achieve multi-stage amplification. For example, such an amplifier 336 may be an RF power transistor. Further, output of the amplifier 336 may be approximately 100 to 1,000 W.

Next, the phase shifter 362 may feed back output of the amplifier 336, thus achieving phase shift. A phase shift amount may be adjusted by a phase control signal of the microwave controller 350. The phase shifter 362 may achieve phase shift of an amplification signal of a designated frequency output from the amplifier 336, thereby generating microwaves of various frequencies, as described above. For example, the number of frequencies may be increased in proportion to the phase shift amount.

Preferably, a signal corresponding to approximately 1% to 2% of an amplification signal level of a designated frequency is sampled and input to the phase shifter 362. This is done in consideration of re-amplification in the amplifier 336 after feedback.

The first isolator 364 is located between the amplifier 336 and the DC 338, and transmits the microwaves of the plurality of different frequencies, sequentially output from the amplifier 336, to the microwave transmission unit 112. In more detail, the first isolator 364 supplies the microwaves to the microwave transmission unit 112 via the DC 338. If a signal level of the microwaves supplied from the amplifier 336 is below a set value, the first isolator 364 may supply the microwaves to a ground terminal instead of to the microwave transmission unit 112.

Next, the second isolator 366 re-supplies the signal, the phase of which has been shifted by the phase shifter 362, to the amplifier 336. If the level of the signal, the phase of which has been shifted by the phase shifter 362, is below a set value, the second isolator 366 may supply the signal, the phase of which has been shifted, to a ground terminal instead of to the amplifier 336.

The signal supplied by the second isolator 366 is re-amplified by the amplifier 336. Thereby, microwaves of a plurality of different frequencies are sequentially output.

A feedback transmission line 390 serves to connect the output terminal of the amplifier 336 to the phase shifter 362. The phase shifter 362 is located on the feedback transmission line 390, and, in accordance with the embodiment of the present invention, may include impedance elements, such as a switch and/or a diode.

Figure 6:
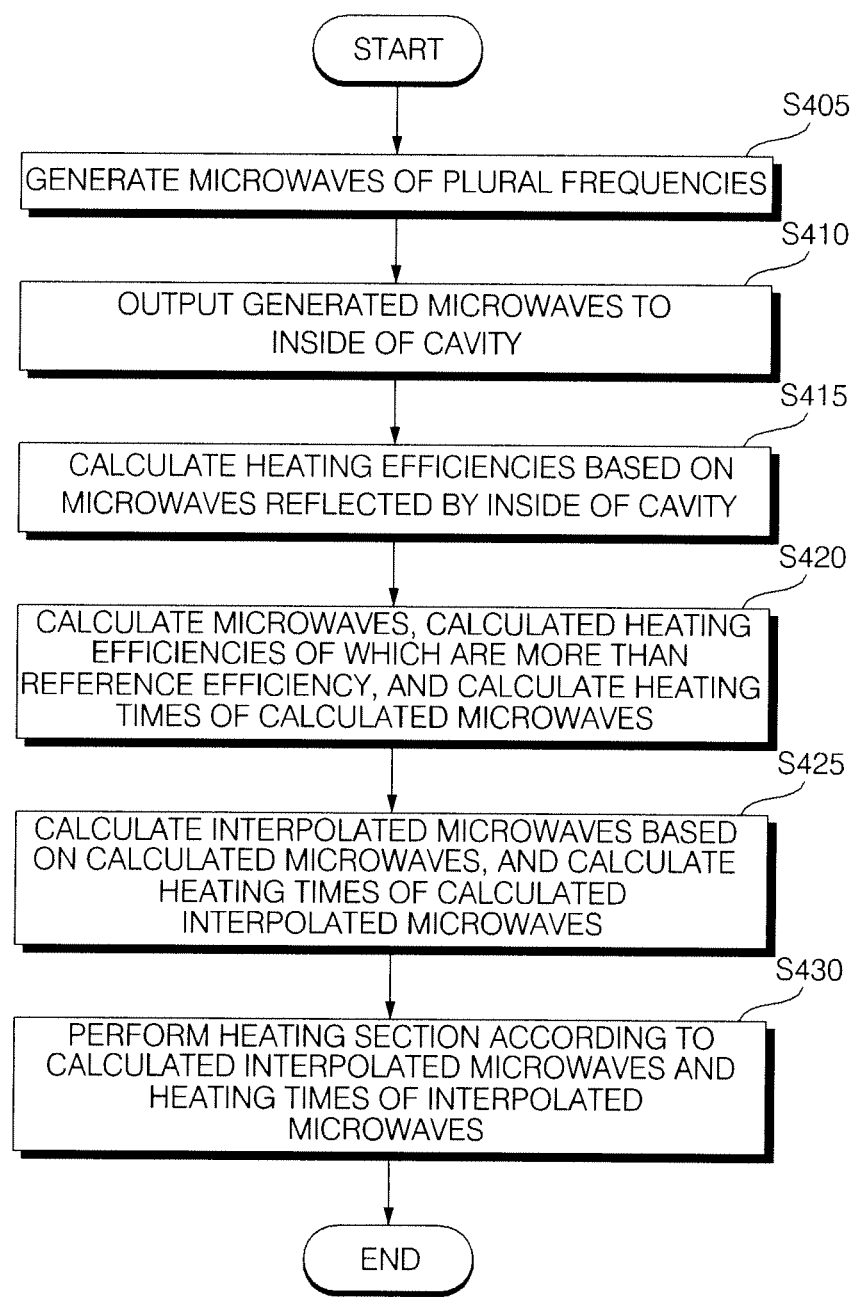
FIG. 6 is a flow chart illustrating an operating method of a cooking apparatus using microwaves in accordance with one embodiment of the present invention.
Figure 7:
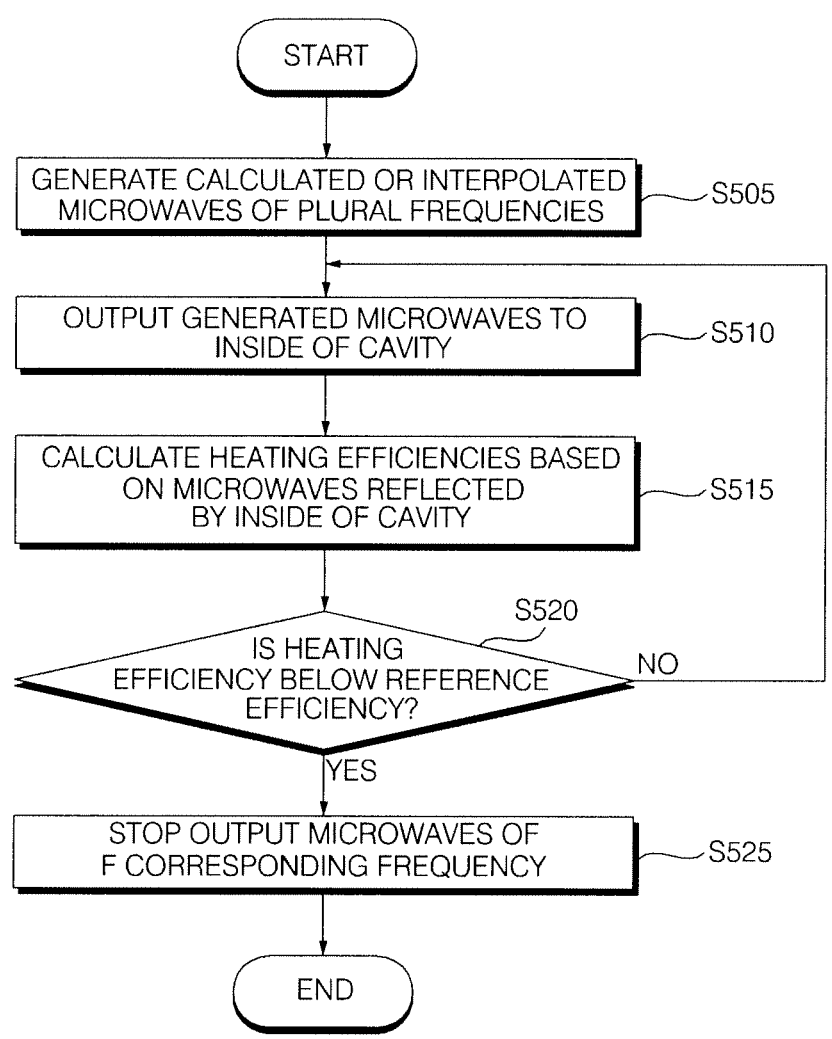
FIG. 7 is a flow chart illustrating a process of performing a heating session of FIG. 6.

FIG. 6 is a flow chart illustrating an operating method of a cooking apparatus using microwaves in accordance with one embodiment of the present invention, FIG. 7 is a flow chart illustrating a process of performing a heating session of FIG. 6, and FIGS. 8 to 11B are reference views illustrating the operating method of FIGS. 6 and 7.

With reference to FIG. 6, first, microwaves of a plurality of frequencies are generated during a scanning session (S405). The microwave generator 110 sequentially generates microwaves of a plurality of different frequencies.

Thereafter, the generated microwaves are output to the inside of the cavity 134 (S410). The microwaves generated by the microwave generator 110 are output to the inside of the cavity 134 through the microwave transmission unit 112. Here, the microwaves of the plurality of frequencies may be sequentially output.

Thereafter, heating efficiencies are calculated based on microwaves reflected by the inside of the cavity 134 (S415). The controller 310 calculates the heating efficiencies using Equation 1 above, based on a power signal detected from the reflected microwaves received by the DC 338. Here, an output power signal of the microwaves output to the inside of the cavity 134 may be referred to.

Thereafter, microwaves, the heating efficiencies of which are more than reference efficiency, are calculated based on the calculated heating efficiencies, and heating times of the calculated microwave frequencies are calculated (S420).

Figures 8, 9:
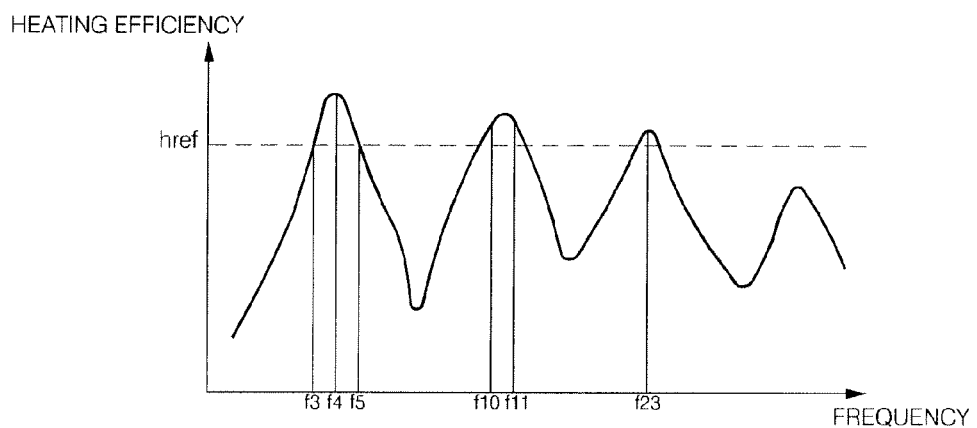
FIGS. 8 to 11B are reference views illustrating the operating method of FIGS. 6 and 7.

FIG. 8 exemplarily illustrates a curve representing heating efficiencies of microwaves according to frequencies during the scanning session. Further, FIG. 9 exemplarily illustrates reference efficiency href of 70%.

With reference to FIGS. 8 and 9, it is understood that 6 frequencies of microwaves have heating efficiencies more than the reference efficiency href. That is, it is understood that frequencies f3, f4, f5, f10, f11 and f23 respectively have heating efficiencies of 70%, 90%, 70%, 73%, 75% and 71%.

Among these, the frequencies f3, f4 and f5 may be regarded as being in a first heating mode, the frequencies f10 and f11 may be regarded as being in a second heating mode, and the frequency f23 may be regarded as being in a third heating mode.

The controller 310 may set heating times to be in inverse proportion to the heating efficiencies of the respective frequencies f3, f4, f5, f10, f11 and f23. For example, the controller 310 may set the heating time of the microwaves of the frequency f4 to be shortest, because the heating efficiency, i.e., 90%, of the microwaves of the frequency f4 is highest, and may set the heating times of the microwaves of the frequencies f3 and f5 to be longest, because the heating efficiency, i.e., 70%, of the microwaves of the frequencies f3 and f5 is lowest.

Further, in the embodiment of the present invention, a frequency interval between the microwaves during the scanning session is preferably wider than a frequency interval between the microwaves during the heating session. Thereby, the scanning session may be rapidly performed. For example, the frequency interval between the microwaves during the scanning session may be set to 2 MHz and the frequency interval between the microwaves during the heating session may be set to 500 kHz.

Thereafter, interpolated microwave frequencies are calculated based on the calculated microwave frequencies, and heating times of the calculated interpolated microwave frequencies are calculated (S425).

The controller 310 calculates interpolated microwave frequencies for the heating session to interpolate the frequencies of the calculated microwave frequencies based on the microwave frequencies calculated during the scanning session, and calculates heating times of the calculated interpolated microwave frequencies.

FIGS. 10A to 11B exemplarily illustrate various methods of generating interpolated microwave frequencies.

Figure 10A:
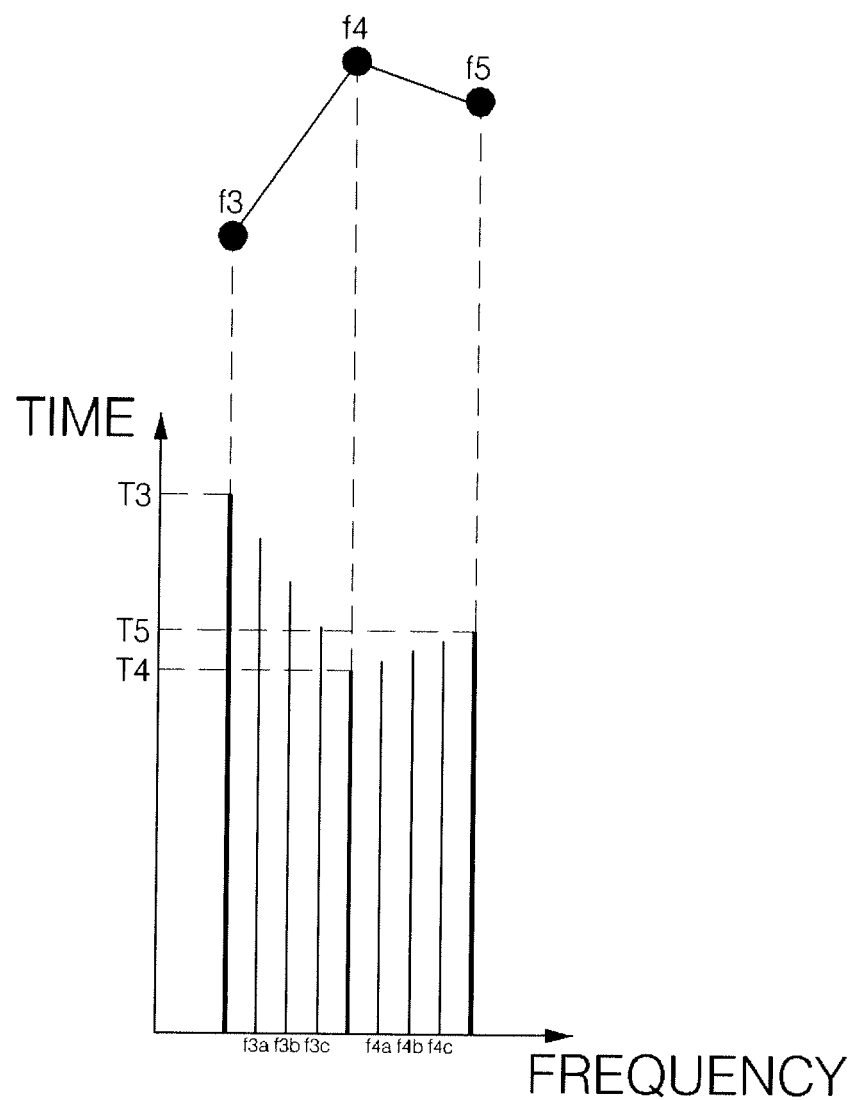

First, with reference to FIG. 10A, if the three frequencies f3, f4 and f5 in the first heating mode are calculated, interpolated microwave frequencies are respectively generated. As described above, for example, if the frequency interval between the microwaves during the scanning session is set to 2 MHz and the frequency interval between the microwaves during the heating session is set to 500 kHz, three interpolation frequencies f3a, f3b and f3c may be generated between the frequencies f3 and f4, and three interpolation frequencies f4a, f4b and f4c may be generated between the frequencies f4 and f5.

Here, the value of the heating efficiency increases from the frequency f3, reaches the maximum at the frequency f4, and then decreases to the frequency f5. Therefore, the heating times of the three interpolation frequencies f3a, f3b and f3c are gradually shortened in proportion to the heating time T3 of the frequency f3 and the heating time T4 of the frequency f4. Further, the heating times of the three interpolation frequencies f4a, f4b and f4c are gradually elongated in proportion to the heating time T4 of the frequency f4 and the heating time T5 of the frequency f5. Thereby, microwaves to be used during the heating session and heating times of the microwaves may be correctly calculated.

Next, the method of FIG. 10B is similar to the method of FIG. 10A, but differs from the method of FIG. 10A in terms of values of heating efficiencies at the frequencies f3, f4 and f5. Hereinafter, such difference will be described in detail.

The value of the heating efficiency decreases from the frequency f3, reaches the minimum at the frequency f4, and then increases to the frequency f5. Therefore, the heating times of the three interpolation frequencies f3a, f3b and f3c are gradually elongated in proportion to the heating time T3 of the frequency f3 and the heating time T4 of the frequency f4. Further, the heating times of the three interpolation frequencies f4a, f4b and f4c are gradually shortened in proportion to the heating time T4 of the frequency f4 and the heating time T5 of the frequency f5. Thereby, microwaves to be used during the heating session and heating times of the microwaves may be correctly calculated.

Figure 10C:
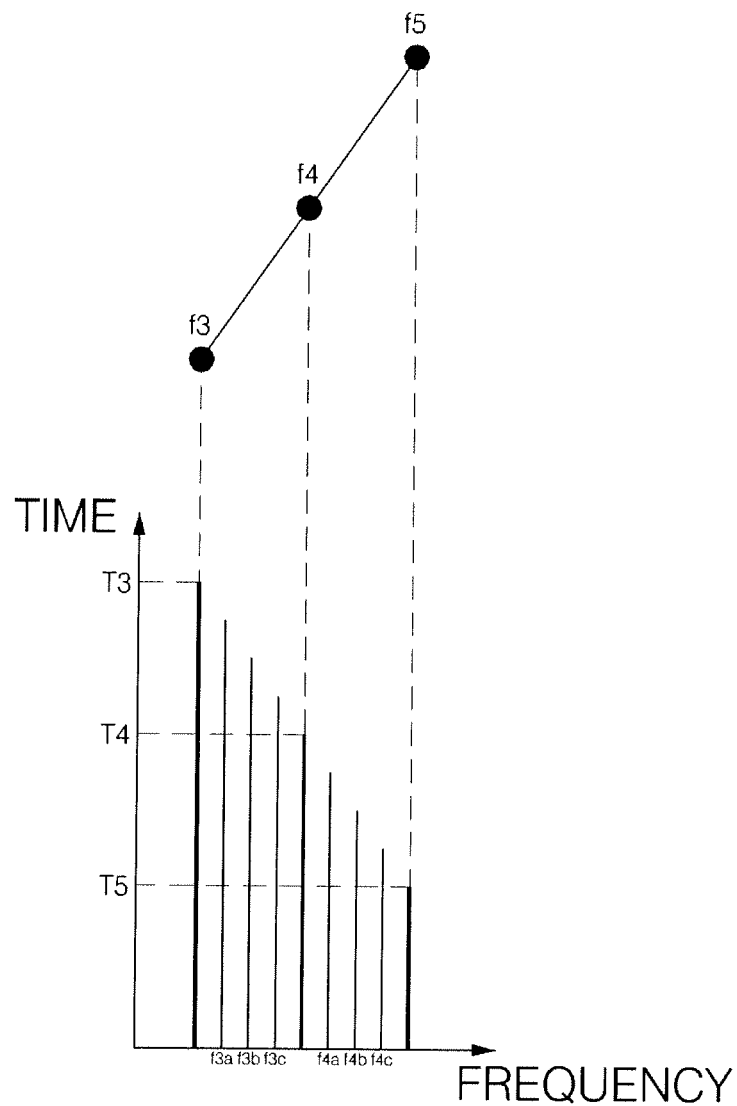

Next, the method of FIG. 10C is similar to the method of FIG. 10A, but differs from the method of FIG. 10A in terms of values of heating efficiencies at the frequencies f3, f4 and f5. Hereinafter, such difference will be described in detail.

The value of the heating efficiency continuously increases from the frequency f3 via the frequency 4 and reaches the maximum at the frequency f5. Therefore, the heating times of the three interpolation frequencies f3a, f3b and f3c are gradually shortened in proportion to the heating time T3 of the frequency f3 and the heating time T4 of the frequency f4. Further, the heating times of the three interpolation frequencies f4a, f4b and f4c are gradually shortened in proportion to the heating time T4 of the frequency f4 and the heating time T5 of the frequency f5. Thereby, microwaves to be used during the heating session and heating times of the microwaves may be correctly calculated.

Next, the method of FIG. 10D is similar to the method of FIG. 10A, but differs from the method of FIG. 10A in terms of values of heating efficiencies at the frequencies f3, f4 and f5. Hereinafter, such difference will be described in detail.

The value of the heating efficiency continuously decreases from the frequency f3 via the frequency f4 and reaches the minimum at the frequency f5. Therefore, the heating times of the three interpolation frequencies f3a, f3b and f3c are gradually elongated in proportion to the heating time T3 of the frequency f3 and the heating time T4 of the frequency f4. Further, the heating times of the three interpolation frequencies f4a, f4b and f4c are gradually elongated in proportion to the heating time T4 of the frequency f4 and the heating time T5 of the frequency f5. Thereby, microwaves to be used during the heating session and heating times of the microwaves may be correctly calculated.

Although FIGS. 10A to 10D illustrate calculation of interpolated microwave frequencies on the assumption that the microwaves of the three frequencies in the first heating mode are calculated, interpolated microwave frequencies may be calculated on the assumption that the microwaves of the two frequencies f10 and f11 in the second heating mode are calculated. This will be described with reference to FIGS. 11a and 11b.

Further, if the microwaves of the one frequency f23 in the third heating mode are calculated, such microwaves are preferably used during the heating session without generation of separate interpolated microwave frequencies.

Figure 11A:
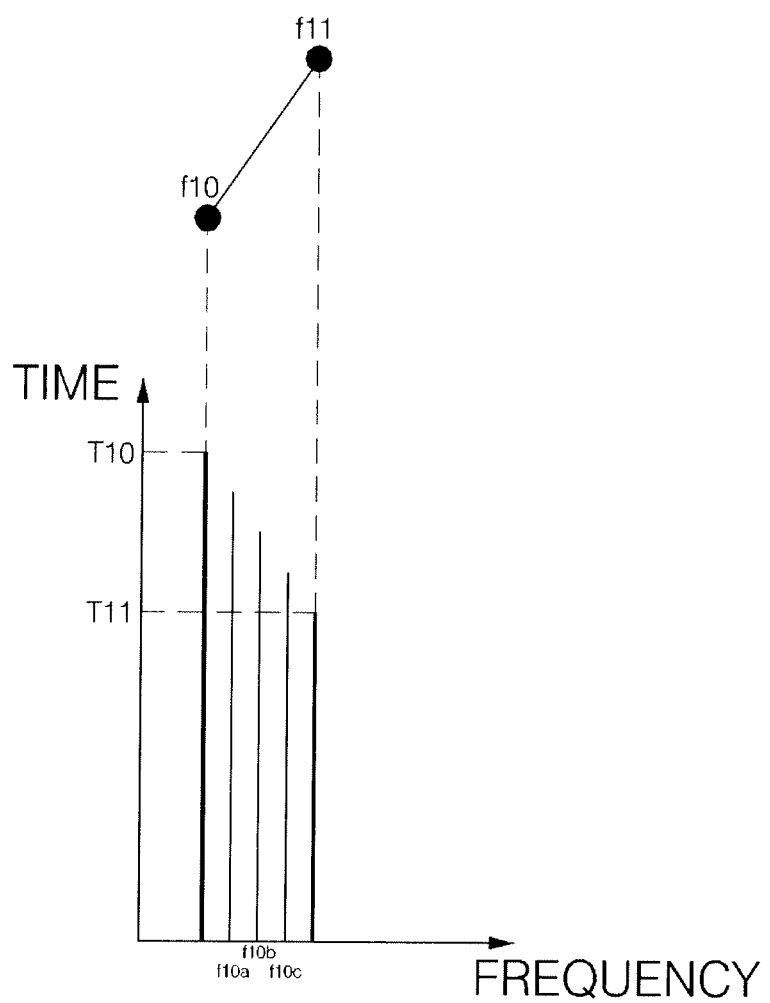

Next, with reference to FIG. 11A, if the two frequencies f10 and f11 in the second heating mode are calculated, interpolated microwave frequencies are respectively generated. As described above, if the frequency interval between the microwaves during the scanning session is set to 2 MHz and the frequency interval between the microwaves during the heating session is set to 500 kHz, three interpolation frequencies f10a, f10b and f10c may be generated between the frequencies f10 and f11.

Here, the value of the heating efficiency increases from the frequency f10 and reaches the maximum at the frequency f11. Therefore, the heating times of the three interpolation frequencies f10a, f10b and f10c are gradually shortened in proportion to the heating time T10 of the frequency f10 and the heating time T11 of the frequency f11. Thereby, microwaves to be used during the heating session and heating times of the microwaves may be correctly calculated.

Figure 11B:
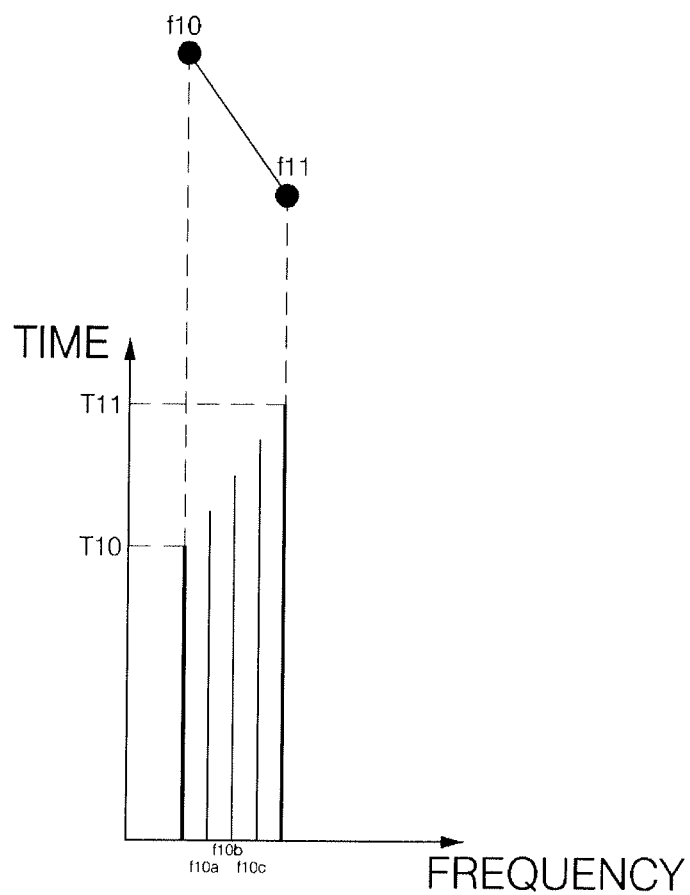

Next, the method of FIG. 11B is similar to the method of FIG. 11A, but differs from the method of FIG. 11A in terms of values of heating efficiencies at the frequencies f10 and f11. Hereinafter, such difference will be described in detail.

The value of the heating efficiency decreases from the frequency f10 and reaches the minimum at the frequency f11. Therefore, the heating times of the three interpolation frequencies f10a, f10b and f10c are gradually elongated in proportion to the heating time T10 of the frequency f10 and the heating time T11 of the frequency f11. Thereby, microwaves to be used during the heating session and heating times of the microwaves may be correctly calculated.

After the calculation of the interpolated microwave frequencies and the calculation of the heating times of the interpolated microwave frequencies (S425), the heating session is performed (S430). The heating session may be performed as shown in FIG. 7.

With reference to FIG. 7, the process of performing the heating session (S425) may include generating calculated or interpolated microwave frequencies of a plurality of frequencies (S505), outputting the generated microwaves to the inside of the cavity (S510), calculating heating efficiencies based on microwaves reflected by the inside of the cavity (S515), judging whether or not heating efficiency of microwaves of a frequency is below the reference efficiency based on the microwaves reflected by the inside of the cavity from among the output microwaves (S520), and stopping output of the microwaves of the corresponding frequency upon judging that heating efficiency of microwaves of the frequency is below the reference efficiency (S525).

Even during the heating session, heating efficiencies may be calculated based on the microwaves reflected by the inside of the cavity, whether or not a calculated heating efficiency is below reference efficiency may be judged, and output of the microwaves of a corresponding frequency may be stopped and the microwaves of the next frequency may be output upon judging that the calculated heating efficiency is below the reference efficiency.

The controller 310 may perform the above control operations of the microwave controller 350. The controller 310 may calculate interpolated microwave frequencies for a heating session, based on microwave frequencies calculated during a scanning session, so as to interpolate frequencies of the calculated microwave frequencies, and calculate heating times of the calculated interpolated microwave frequencies.

The controller 310 may calculate heating efficiencies based on microwave frequencies reflected by the inside of the cavity from among the output microwaves, calculate microwaves, the calculated heating efficiencies of which are more than reference efficiency, and calculate heating times of the calculated microwave frequencies.

The controller 310 may calculate heating times of the calculated microwave frequencies, and calculate the heating times of the interpolated microwave frequencies in proportion to the heating times of the calculated microwave frequencies, if there are at least two calculated microwave frequencies.

The controller 310 may set frequencies of the interpolated microwave frequencies in proportion to frequencies of the calculated microwave frequencies, if there are at least two calculated microwave frequencies.

The controller 310 may control the microwave generator during the heating session such that the microwave generator outputs microwaves of a next frequency if a heating efficiency of microwaves of a frequency based on microwaves reflected by the inside of the cavity is below a reference efficiency.

The controller 310 may set the calculated heating times to be shortened, as heating efficiencies during the scanning session increases.

The controller 310 may calculate the interpolated microwave frequencies according to a plurality of heating modes of the calculated microwave frequencies.

Although the embodiment of the present invention describes the cooking apparatus using microwaves, the present invention is not limited thereto and the cooking apparatus using microwaves may be combined with various cooking apparatuses. As one example, the cooking apparatus using microwaves in accordance with the embodiment of the present invention may be combined with an oven-type cooking apparatus using a heater as a heating source. Further, as another example, the cooking apparatus using microwaves in accordance with the embodiment of the present invention may be combined with a cooking apparatus using an induction heater as a heating source. Further, as a further example, the cooking apparatus using microwaves in accordance with the embodiment of the present invention may be combined with a cooking apparatus using a magnetron as a heating source.

The cooking apparatus in accordance with the present invention is not limited to configurations and methods of the above-described embodiments, and all or some of the respective embodiments may be selectively combined so as to achieve various modifications.

As apparent from the above description, in a cooking apparatus in accordance with one embodiment of the present invention, interpolated microwave frequencies for heating are calculated based on microwave frequencies calculated during the scanning session so as to interpolate frequencies of the calculated microwave frequencies, and heating times of the calculated interpolated microwave frequencies are calculated, thereby shortening the scanning session and stably securing the heating session. Thereby, heating may be effectively achieved.

That is, a frequency interval between microwaves output to the inside of the cavity during the heating session may be set to be narrower than a frequency interval between microwaves output to the inside of the cavity during the scanning session. Thereby, heating may be effectively achieved.

Further, frequencies of the interpolated microwave frequencies may be set in proportion to frequencies of the calculated microwave frequencies or heating times of the interpolated microwave frequencies may be calculated in proportion to heating times of the calculated microwave frequencies, thereby being capable of correctly calculating microwaves to be used during the heating session and the heating times of the microwaves.

Moreover, even during the scanning session, the heating efficiencies are calculated based on microwaves reflected by the inside of the cavity, whether or not a calculated heating efficiency is below reference efficiency is judged, and output of the microwaves of a corresponding frequency is stopped and the microwaves of the next frequency are output upon judging that the calculated heating efficiency is below the reference efficiency, thereby effectively performing heating of an object to be heated.

Effects of the present invention are not limited to the above-stated effects, and those skilled in the art will understand other effects, which are not stated above, from the accompanying claims.

Although the embodiments of the present invention have been disclosed for illustrative purposes, those skilled in the art will appreciate that various modifications and applications are possible, without departing from the scope and spirit of the invention as disclosed in the accompanying claims. For example, the respective elements described in detail in the embodiments may be modified. Further, it will be understood that differences relating to such modifications and applications are within the scope of the invention defined in the accompanying claims.

What is claimed is:
1. A cooking apparatus comprising:
a cavity; and
a microwave generator to generate and output microwaves of a plurality of frequencies to heat an object within the cavity, and a controller to calculate interpolated microwave frequencies for a heating session, based on microwave frequencies calculated based on heating efficiencies during a scanning session, and to calculate heating times of the calculated interpolated microwave frequencies, wherein the heating times are calculated based on an inverse relationship of the heating efficiencies of the microwave frequencies during the scanning session, wherein a frequency interval between the microwaves output to the inside of the cavity during the heating session is narrower than a frequency interval between microwaves output to the inside of the cavity during the scanning session, wherein the controller controls the microwave generator during the heating session such that the microwave generator outputs microwaves of a next interpolated microwave frequency if a heating efficiency of interpolated microwaves of a frequency based on microwaves reflected by the inside of the cavity is below a reference efficiency.

2. The cooking apparatus according to claim 1, wherein the controller calculates heating efficiencies based on microwaves reflected by the inside of the cavity, the calculated heating efficiencies of which are more than a reference efficiency, calculates microwave frequencies, and calculates heating times of the calculated microwave frequencies.

3. The cooking apparatus according to claim 1, wherein the controller calculates heating times of the calculated microwave frequencies and calculates the heating times of the interpolated microwave frequencies in proportion to the heating times of the calculated microwave frequencies, if there are at least two calculated microwave frequencies.

4. The cooking apparatus according to claim 1, wherein the controller sets frequencies of the interpolated microwaves in proportion to frequencies of the calculated microwaves, if there are at least two calculated microwave frequencies.

5. The cooking apparatus according to claim 1, wherein the controller shortens the calculated heating times as heating efficiencies increase during the scanning session.

6. The cooking apparatus according to claim 1, wherein the controller calculates the interpolated microwave frequencies according to a plurality of heating modes of the calculated microwave frequencies.

7. The cooking apparatus according to claim 1, wherein power of the microwaves output to the inside of the cavity during the heating session is greater than power of the microwaves output to the inside of the cavity during the scanning session.

8. The cooking apparatus according to claim 1, further comprising a microwave transmission unit to transmit a plurality of microwave frequencies generated by the microwave generator.

9. The cooking apparatus according to claim 1, wherein the microwave generator further comprises:
- a frequency oscillator to oscillate a microwave frequency according to an input frequency control signal; and
- an amplifier to amplify the oscillated microwave frequency signal and to output a microwave to heat an object within the cavity.

10. The cooking apparatus according to claim 1, further comprising a directional coupler to transmit the microwaves output from the microwave generator to the inside of the cavity and to receive microwaves reflected by the inside of the cavity.

11. The cooking apparatus according to claim 1, wherein the microwave generator includes an amplifier to perform frequency oscillation and amplification and then to output amplified microwaves.

12. The cooking apparatus according to claim 1, wherein the controller sets a frequency interval between the microwaves output to the inside of the cavity during a heating session to be narrower than a frequency interval between microwaves output to the inside of the cavity during a scanning session.

* * * * *